United States Patent [19]

Frechette et al.

[11] Patent Number: 5,354,527
[45] Date of Patent: Oct. 11, 1994

[54] PROCESS FOR MAKING SILICON CARBIDE CERAMIC FIBERS

[75] Inventors: Francis J. Frechette, Tonawanda; Roger S. Storm, Clarence; Viswanathan Venkatswaren, Amherst; Michael J. Andrejcak, Niagara Falls; Jonathan J. Kim, Williamsville, all of N.Y.

[73] Assignee: The Carborundum Company, Niagara Falls, N.Y.

[21] Appl. No.: 838,960

[22] Filed: Feb. 21, 1992

[51] Int. Cl.$^5$ ........................... C04B 35/69; D01F 1/02
[52] U.S. Cl. .......................... 264/63; 264/66; 264/211.17
[58] Field of Search ............... 264/63, 65, 66, 211.11, 264/211.12, 211.14, 211.17; 501/95

[56] References Cited

U.S. PATENT DOCUMENTS

| | | | |
|---|---|---|---|
| 2,939,199 | 7/1960 | Strivens | 25/156 |
| 3,529,044 | 9/1970 | Santangelo | 264/29 |
| 3,808,015 | 4/1974 | Seufert | 106/65 |
| 3,971,840 | 7/1976 | Economy et al. | 264/231 |
| 3,992,498 | 11/1976 | Morton et al. | 264/63 |
| 4,071,594 | 1/1978 | Pearson et al. | 264/63 |
| 4,117,057 | 9/1978 | Yajima et al. | 264/63 |
| 4,158,687 | 6/1979 | Yajima et al. | 264/60 |
| 4,250,131 | 2/1981 | Sobel et al. | 264/56 |
| 4,346,049 | 8/1982 | Coppola et al. | 264/63 |
| 4,515,742 | 5/1985 | Yajima et al. | 264/63 |
| 4,530,808 | 7/1985 | Renlund et al. | 264/63 |
| 4,551,496 | 11/1985 | Renlund et al. | 264/63 |
| 4,788,018 | 11/1988 | Yamada et al. | 264/63 |
| 4,908,340 | 3/1990 | Frechette et al. | 501/95 |
| 4,942,011 | 7/1990 | Bolt et al. | 264/29.2 |
| 5,023,231 | 6/1991 | Hsu | 505/1 |
| 5,063,107 | 11/1991 | Birchall et al. | 428/367 |

FOREIGN PATENT DOCUMENTS 2016475  3/1991  Canada .
0435065A1 12/1990 European Pat. Off. .
0438117A1  1/1991 European Pat. Off. .

OTHER PUBLICATIONS

Polymer-Derived Ceramic Fibers, Jonathan Lipowitz Ceramic Bull vol. 70, No. 12, 1991.
Crystalline Silicon Carbide Fibers Derived From Organosilicon Polymers-Jonathan Lipowitz.

Primary Examiner—Peter A. Nelson
Attorney, Agent, or Firm—Scott A. McCollister

[57] ABSTRACT

A method for forming a polycrystalline ceramic fiber which comprises blending about 5 to about 25 weight percent polymer, about 70 to about 95 weight percent silicon carbide powder and greater than 1 weight percent sintering aid; forming a fiber from the blend; and sintering the formed fiber. Preferably, the sintering aid is boron carbide. In addition, the fiber is preferably pre-sintered at a first temperature of from about 1700° C. to 2300° C. and then subsequently sintered at a second temperature of approximately 2000° C. to about 2300° C.

11 Claims, 4 Drawing Sheets

100μm  KINKS

5μm  POROSITY

STRAIGHT FIBERS

POROSITY

5,354,527

PROCESS FOR MAKING SILICON CARBIDE CERAMIC FIBERS

BACKGROUND OF THE INVENTION

This invention relates to polycrystalline silicon carbide ceramic fiber used for insulation and reinforcement purposes.

HISTORY OF THE PRIOR ART

Ceramic fibers have been used for various purposes including insulation and, to some extent, reinforcement. Alumina, silica and alumina silicate fibers have been manufactured for various uses, including reinforcement, insulation and fillers. Such oxygen containing fibers do not, however, have properties necessary for certain high performance applications. In particular, oxide type fibers often do not have coefficients of thermal expansion which are as close as desirable to the matrix material which is being reinforced and usually do not have heat resistance as high as desirable for very high temperature performance applications. In addition, corrosion resistance of oxide fibers is not as good as desirable in certain environments such as molten metals and high temperature ceramic composites. Furthermore, many oxides do not have an elastic modulus as high as desirable for stiffening and reinforcement applications. Examples of such oxide type fibers may be found in U.S. Pat. Nos. 4,071,594; 4,250,131; 3,808,015 and 3,992,498.

Manufacturing methods for oxide fibers have not been generally applicable to very high temperature creep resistant non-oxide fibers. Such very high temperature non-oxide ceramics tend not to melt at manageable temperatures and in fact tend to decompose or sublime prior to melting making melt spinning difficult.

Attempts have also been made to make non-oxide ceramic fibers by means of organometallic polymer precursors, for example as taught in U.S. Pat. Nos. 3,529,044, 4,117,057 and 4,158,687. Such fibers have not, however, been as good as desired since such precursors tend to leave substantial amounts of substances, such as oxygen, in the fibers which often lead to properties such as reduced strength at high temperature, rapid aging at an elevated temperature, low creep resistance, and a low elastic modulus.

European Patent Nos. 435,065 and 438,117 describe polycrystalline silicon carbide fibers with good tensile strength, formed from a ceramic polymeric precursor such as phenyl-containing polyorganosiloxane resins. Despite having reduced oxygen, these fibers still contain oxygen and are not comprised of substantially stoichiometric SiC. Accordingly, the fibers have a relatively low modulus of elasticity, poor creep resistance and suffer rapid thermal aging. In addition, the density of the fibers is a relatively low 2.93–3.03 gm/cm$^3$.

U.S. Pat. No. 4,942,011 demonstrates a silicon carbide fiber prepared by adding silicon carbide particles to a polymeric silicon carbide precursor, such as polycarbosilane. Although a relatively high a density of 3.19 gm/cc is obtained, the average fiber strength of 101 kpsi (determined at $\frac{1}{4}$″ gauge length) does not satisfy current composite industry requirements. In addition, the elastic modulus (Young's modulus) was below desired levels at 12 mpsi. As in the other silicon carbide precursor patents, the silicon carbide formed from a precursor is not substantially stoichiometric silicon carbide, therefore the U.S. Pat. No. 4,942,011 patent has limited modulus of elasticity, creep resistance, and resistance to thermal aging.

U.S. Pat. No. 4,908,340, herein incorporated by reference, teaches the preparation of a textilable sinterable fiber and its corresponding sintered fiber comprised of non-oxide ceramic powders. The fiber usually comprises a boride, carbide, nitride or silicide of a different element, having a diameter of between 1 and 200 microns. The green textilable sinterable fiber is machine weavable, spinnable, and knittable, and is comprised of a flexible polymer matrix containing high temperature sinterable ceramic powder particles. The average particle size is less than 0.15 times the diameter of the sinterable fiber and is preferably submicron. The examples of U.S. Pat. No. 4,908,340 demonstrate relatively high tensile strength non-oxide fibers prepared in a batch process. However, the current invention demonstrates an exceptionally and unexpectedly very high strength, very high density fiber.

In addition to the fiber of the current invention, the industry has lacked an effective means for the continuous production of a sintered silicon carbide fiber with high tensile strength, good creep resistance, resistance to thermal aging, good elasticity, and high density. The invention described herein teaches a process for continuous sintering of such a fiber. As used herein, a continuous fiber refers to a fiber of suitable length for use in a variety of manufactured articles such as a composite.

SUMMARY OF THE INVENTION

Accordingly, it is a primary object of this invention to provide new and improved polycrystalline silicon carbide fiber.

To achieve the foregoing objects and in accordance with the purposes of the invention, as embodied and broadly described herein, the fiber of this invention comprises a polycrystalline ceramic fiber comprising substantially stoichiometric silicon carbide and having a tensile strength greater than about 200,000 psi, more preferably about 220,000 psi. Generally, the fiber will have a diameter less than about 200 microns and preferably a density greater than about 97 percent of theoretical density, more preferably greater than about 98 percent of theoretical density. Preferably, the porosity is less than about 4.0 percent, and more preferably less than 2.0 percent. Porosity as used herein means total porosity.

Preferably, the fiber is comprised of at least about 95 percent by weight substantially stoichiometric silicon carbide and more preferably at least about 98 percent substantially stoichiometric silicon carbide. The fiber is stable at temperatures above about 1700° C. in an inert atmosphere (slightly lower under stress) and about 1550° C. in air. Stable as used herein means that the fiber does not undergo substantial oxidation or decomposition effecting tensile strength.

The fiber will preferably have a Young's modulus greater than about 50 mpsi and a steady state creep rate of less than about $1.0 \times 10^{-8}$/sec under a stress of about 30 ksi at a temperature of about 1400° C., more preferably a steady state creep rate of less than about $1.0 \times 10^{-9}$/sec.

It is a further object of this invention to provide a continuous sintering process to produce such a fiber.

The sintered silicon carbide fiber is formed via a process comprising blending 5 to 25 weight percent polymer, 70 to 95 weight percent silicon carbide and preferably at least 1 weight percent sintering aid to form a mix, thereafter forming a fiber from the mix and sintering the fiber. In an alternative embodiment, the sintering atmosphere can be sufficiently sealed to maintain an effective amount of a sintering atmosphere and the amount of sintering aid included in the mix can be reduced, preferably to at least about 0.2 weight percent.

The invention also provides for a two stage sintering process, in which a blend is prepared by blending about 5 to about 25 weight percent polymer and about 70 to about 95 weight percent silicon carbide, forming a fiber from said blend, pre-sintering said fiber at a first temperature, and then sintering said pre-sintered fiber at a second temperature greater than said first temperature. Each of these processes can be carried out continuously and preferably with the fiber under tension during the second sintering stage.

The fiber of the present invention is envisioned for use as reinforcement in a structural material comprising a matrix material and a polycrystalline ceramic fiber wherein the fiber comprises at least about 95% by weight substantially stoichiometric silicon carbide and having a tensile strength greater than 200,000 psi. Preferably, the structural material is metal, ceramic, glass, glass ceramic, polymer, carbon or mixtures thereof.

DETAILED DESCRIPTION OF THE INVENTION

Figure 1:
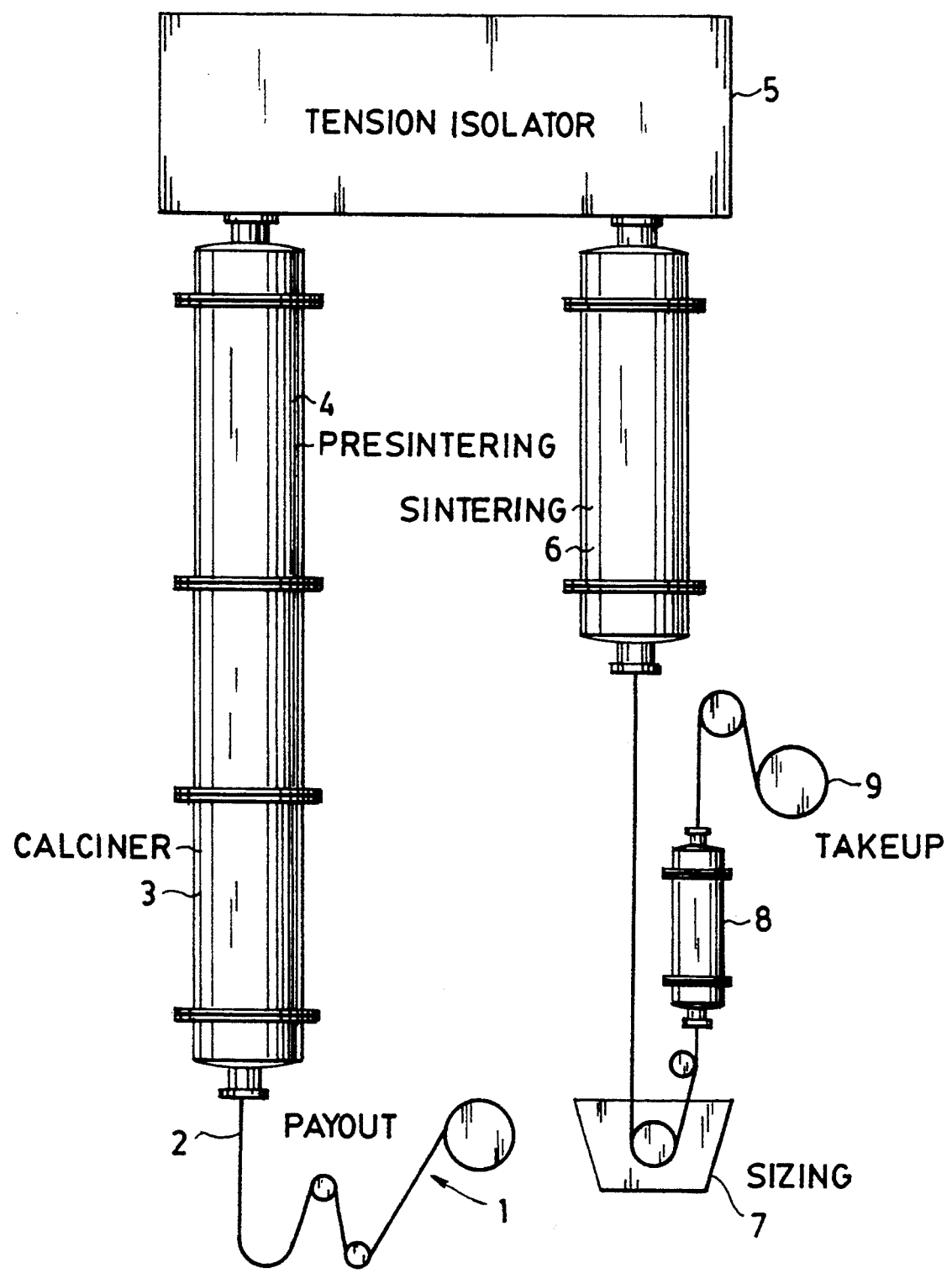
FIG. 1 is a schematic of the continuous sintering apparatus of the current invention.

While the invention is described in connection with a preferred embodiment it will be understood that it is not intended to limit the invention to that embodiment. On the contrary, it is intended to cover all alternatives, or equivalents that may be included within the spirit and scope of the invention defined by the appended claims.

The SiC fibers are stable in an inert atmosphere at temperatures in excess of 1700° C. The fibers in accordance with the invention are generally at least 95% substantially stoichiometric silicon carbide and preferably greater than 98% substantially stoichiometric silicon carbide materials. The performance of the sintered fibers of this invention without an oxide phase is therefore not significantly affected by oxide phases, as was the case of non-oxide ceramic fibers which were prepared by other processes, for example by use of ceramic precursors. The fibers of this invention preferably contain less than 1.0 percent by weight oxygen or nitrogen and more preferably contain less than 0.1 percent by weight oxygen or nitrogen by weight and most preferably less than 0.05 percent by weight oxygen or nitrogen.

In addition, without the use of precursors, i.e. directly sintering the SiC, the current fibers are comprised of substantially stoichiometric silicon carbide. This results in excellent creep resistance, a high modulus of elasticity and excellent resistance to thermal aging. Substantially stoichiometric as defined herein means more stoichiometric than fibers prepared using silicon carbide precursor materials, such as polycarbosilane. Fibers formed from precursors result from chemical reaction to form silicon carbide. The reaction method produces certain undesired chemical bonding. In contrast, the current invention starts with stoichiometric silicon carbide particles and forms a stoichiometric silicon carbide fiber. There is no chemical reaction required in the present invention, which provide the opportunity for undesirable bonding in the crystal structure. In fact, the current process does not involve any substantial amount of phase transformation (probably less than 1% and certainly believed to be less than 5%). Therefore, stoichiometric as used herein is intended to mean fibers containing immeasurable amounts of silicon-silicon, silicon-oxygen or silicon-nitrogen bonds in the crystal structure.

The polymer matrix of the present invention may comprise any polymer with fiber forming characteristics and/or a char yield polymer including phenolics, polyolefins, polyhalogenated olefins including polyvinyl-chloride, or any other polymer which is free from atoms which will tend to decompose to the ceramic material at elevated temperatures. The resin must be capable of self-decomposing at sintering temperature or below to form volatile products or in some cases to form a small percentage of residual carbon which may aid the sintering process. Specific desirable polyolefins are polyethylene and polypropylene.

Sintering aids which are included in the composition forming the textliable fibers are such sintering aids as are known to those skilled in the art. AlN, $Al_2O_3$ and $Y_2O_3$ are examples of suitable sintering aids. When the ceramic powder is silicon carbide, a particularly desirable sintering aid is boron carbide and optional carbon. In the continuous sintering process of the current invention, it has been discovered that boron is lost during sintering and that it is essential to maintain the requisite boron content. Accordingly, it is preferable to use a starting boron content in excess of 1 percent by weight of the silicon carbide powder and more preferably, a boron content greater than 2 percent by weight of the silicon carbide powder. Preferably, the starting boron content will be sufficient to yield a sintered silicon carbide fiber containing between about 0.1 and 3.0 percent by weight boron. Alternatively, about 4 percent boron carbide by weight of the silicon carbide is used. As described herein, it is also possible to minimize the amount of added boron necessary by reducing the amount of boron lost from the sintering furnace environment. This is generally achieved by sintering in a furnace with relatively narrow inlet and outlet openings for the fibers to pass through. The narrow openings prevent a loss of large amounts of the sintering atmosphere. Accordingly, the sintering atmosphere will maintain requisite levels of sintering aid. Although this embodiment is described with regard to a silicon carbide/boron system, the significance of the discovery is the necessity to maintain sintering aid levels in a continuous process. Accordingly, the invention encompasses requisite levels of sintering aid for each of the non-oxide ceramics contemplated by the invention.

The sinterable fiber and the composition forming it desirably contain from about 70 to about 95 weight percent ceramic powders and from about 5 to about 25 weight percent organic compounds. The average particle size of the starting silicon carbide particles is generally less than 1.0 micron and is preferably less than 0.5 micron. The organic portion of the composition forming the sinterable fiber includes not only the polymers but any other organic materials which is desirable, including such as oleic acid, petroleum jelly, surfactants such as dioctylphthalate, oils such as corn oil, dimethylformamide which acts as a polymer solvent and tetraethylhexal-titanate which acts as a dispersion aid. The composition, as above described with respect to the fibers, is exclusive of diluents utilized in the system to form a sinterable fiber. Such diluents can include a number of organic compounds such as ethanol, acetone, oils, and volatile hydrocarbons such as toluene and hexane.

The sinterable fibers continuously produced are formed through melt spinning. In melt spinning, the silicon carbide, the sintering aids, and organic compounds including polymers, plasticizers, and dispersants are melt blended. The blended components are then desirably pelletized and the pellets are melt spun by extrusion. The resulting sinterable fibers are collected. The process generally consists of four steps: 1) deaglomeration and dispersion of submicron silicon carbide powder, 2) compounding the dispersed powder with fiber forming polymers without destroying the dispersed state 3) melt-spinning the mix using preferably thermoplastic extrusion through spinnerettes, 4) stretching to reduce diameter. The apparatus used for the continuous sintering process as shown in FIG. 1 consists of: a mechanism to feed the fiber 1, a dip tank for sizing 2, a calcining furnace 3, a pre-sintering furnace 4, a tension isolator 5, a sintering furnace 6, further sizing 7, a sizing drying furnace 8, and a mechanism to take up the sintered fiber 9.

The process to produce high strength, high modulus creep resistant polycrystalline SiC fibers begins with green fiber formation using the 4 steps outlined above. The non-oxide ceramic powder is deagglomerated in a ball mill or other dispersive type mill as a slurry containing the powders, sintering aids, dispersion aids, polymers and plasticizers in a suitable liquid medium. Milling is carried out until the desired dispersed state is achieved. A suitable liquid in this case is any liquid which is a good solvent for the carbon source sintering aid, such as acetone when the carbon source is novolac resin. The carbon source provides a carbon residue which is desirable for sintering of SiC in addition to the other sintering aids, such as boron carbide. The use of a solvent permits a good distribution of carbon source throughout the mixture. After milling, the solvent is removed by evaporation. The plasticizer and the dispersion oils prevent the powder particles from reforming hard agglomerates when the solvent has evaporated. After evaporating the solvent to the point where the slurry has a mortar like consistency it is placed in a heated mixer capable of generating relatively high shearing forces normally required for compounding thermoplastics. A suitable mixer for this step is a Brabender Prep Center Mixing Bowl equipped with roller type blades.

The slurry is mixed and heated to between 120° C. and 190° C. Preferably, it is heated to around 150° C. Mixing is performed at a rate and for a time necessary to achieve a uniformly dispersed state. Preferably, if the mixing is rotary it is conducted at about 40 rpm for at least 30 minutes. Mixing may be performed by other suitable means such as a twin screw compounder. During mixing, the polymers are partially dissolved in the oils and comingled with the ceramic powders.

The mixed compound is removed, cooled and chopped into random sized small pieces. The pieces of the mix are then extruded into a strand, cooled and cut into pellets. The pieces may be extruded using a ¾" screw extruder containing a series of 6 screens with successively smaller openings from 300μm to 5μm equipped with a strand die. The extrusion is then cut to shorter lengths, for example ¼" pellets.

The pellets thereafter are remelted in an extruder and delivered to a gear pump which meters the material to a spinnerette. The size of the holes in the spinnerette, the extrusion rate and the fiber winding speed will determine the ultimate fiber diameter. Preferably, the plate contains holes having a diameter of 0.1 mm each. Godet rolls provide further attenuation and reduction in fiber diameter. Fibers between 10 and 100 microns can be produced from a 0.1 mm spinnerette. Preferably, between 10 and 50 microns. The attenuated fibers are gathered into a bundle, collected and spooled. Preferably, they are spooled using a traversing winder. The spooling speed also affects fiber diameter, 150' per minute is acceptable. Diameter uniformity is effected by the draw ratio and the desired fiber diameter. The draw ratio is the ratio of the fiber winding velocity to the extrusion velocity. Control of these parameters for a particular spinnerette orifice diameter strongly effects the uniformity of the fiber diameter. The spool is removed from the winder and immersed in a container of solvents. Preferably, the solvent is heptane or another solvent which extracts the plasticizers and oils. Thereafter, the fibers are dried and prepared for continuous sintering.

The spooled green fibers (the fiber tow) is coated with any material known to those skilled in the art to maintain the fibers bundle integrity preferably with a 0.75% solution of Q-PAC TM, a polyalkylene carbon copolymer (available from Air Products and Chemicals) in toluene. This coating can be applied at any rate, for example 15' per minute. The collected fibers are then processed through the calcining and sintering furnaces. The rate of processing is determined by the desired sintered fiber characteristics.

Preferably, a two-zoned calcining furnace is used. The furnace generally is kept at a first lower and then a second respectively higher temperature. For example 250° C. and then at 375° C. The fiber leaves the calcining furnace and enters a sintering furnace. The sintering temperature is generally between 1700° C. and 3000° C. and is usually between 1800° C. and about 2300° C. The sintering time is usually from 0.1 to 90 minutes and preferably from 0.1 to 20 minutes.

An alternate sintering process which provides unexpectedly superior results is a two stage operation. During the first stage, the fibers are passed to the two zone calcining 3 and pre-sintering furnace 4 to form a pre-sintered package. The two-zoned calcining temperatures are from 200° C. to 300° C. and from 375° C. to 800° C. respectively. The pre-sintering temperature is approximately 1700° C. to 2300° C. The pre-sintered package is then subjected to a second pass during which time sintering is more fully completed. The temperature during the second pass is generally higher than the first pass sintering temperature, about 2000° C.–2300° C. It is feasible, but not preferred, to have a two stage sintering with two identical temperatures. The fiber pass rate is dependent on the system and temperatures, however, generally about 15–75 inches per minute. Tension is used on the second sintering stage. Preferably, the tension is between 10–100 psi, and perhaps as high as 5,000 psi. The application of tension during sintering helps to produce straight fibers without kinks. Although FIG. 1, shows separate sintering furnaces, it is foreseeable to use a single furnace with two separate passes.

Fibers formed through a continuous process utilizing the above-identified materials and subject to a two-pass operation have generally shown a tensile strength of greater than 85,000 psi on a 10" gauge test with a Weibull modulus of 5.7. The strength of the fiber at any other gauge length can be estimated from strength obtained at a given gauge length using Weibull's equation [W. Weibull, "A Statistical Theory of the Strength of Materials", Proceedings of the Royal Swedish Institute for Engineering Research, No. 151, (1939)] given below:

$$\sigma_1 = \sigma_2 \left(\frac{L_2}{L_1}\right)^{1/m}$$

where $\sigma_2$ is mean strength at a gauge length $L_2$ and $\sigma_1$ is the mean strength at gauge length $L_1$; and m is the Weibull modulus. The Weibull modulus m is determined at a reference gauge length, which is 10" in our invention. The Weibull modulus is determined using a regression analysis between the failure probability of fiber and strength of the fiber at 10", as taught in the literature [W. Weibull, "A Statistical Theory of the Strength of Materials", Proceedings of the Royal Swedish Institute for Engineering Research, No. 151, (1939)]. This Weibull modulus is then used in the above equation to determine the strength at any other gauge length. The extrapolation to other gauge lengths is carried out only when the Weibull modulus determined from the regression analysis corresponds to a regression coefficient (goodness of fit) greater than or equal to 0.95. Accordingly, the mean strength of 87,000 psi at a 10" gauge length with a Weibull modulus of 5.7 will translate to 130,000 psi at a 1" gauge length. Fibers prepared via a two-pass sintering process in combination with excess boron or a sintering furnace which substantially seals the continuous sintering atmosphere to minimize boron loss typically show a tensile strength of at least 129,000 psi on a 10" gage test, with a Weibull modulus 5.0, which calculates to a 1" tensile strength of over 200,000 psi. Fibers prepared by the process of this invention possess measured average tensile strength of 129,000 psi on a 10" gage length with a Weibull modulus of 5.0. This corresponds to an average 1" tensile strength of 209,000 psi and a ¼" tensile strength of 270,000 psi. It is significant to note that these are average tensile strengths and not single high spike values as often reported in the art. The fibers of this invention possess a creep parameter of greater than 0.5 as determined by the procedures of DeCarlo et al. at 1400° for 1 hour in air. *Proceedings of 3rd NASA HITEMP Review*, Oct. 1990, pp. 49-1 to 49-8. Preferably, the creep parameter is greater than 0.7. More preferably, the creep parameter is greater than 0.75. This creep parameter is expressed as a creep resistance of the fiber evaluated at 1400° C. for 1 hour. The fibers have been found to have a steady state tensile creep rate of less than $1.0 \times 10^{-8}$/sec at 1400° C. under a 30 ksi stress.

The sintered fibers of this invention are substantially crystalline which as defined herein means that they are comprised of at least 95 percent crystallinity, more preferably 98 percent crystallinity and most preferably 99 percent crystallinity.

Silicon carbide fibers made in accordance with the present invention may be stable in air at temperatures as high as 1,700° C. and can be stable in an inert atmosphere at temperatures as high as 2,300° C. "Stable" as used herein means chemically and physically stable, i.e. the material does not significantly decompose, melt, or sublime.

The silicon carbide fibers also do not lose tensile strength after exposure to high temperatures. Particularly, the fiber will lose less than about 10 and preferably less than about 5 percent of its starting room temperature tensile strength after heating to 1370° C. in air for twelve hours. More preferably, the fiber will lose less than about 1 percent of its room temperature tensile strength.

The fiber of the present invention is generally comprised of alpha silicon carbide with an average grain size between about 0.5 and 4.0 microns with the absence of a substantial intergranular phase of other materials which may cause grain boundary sliding. The fiber is generally comprised of silicon carbide wherein at least 95 percent by weight of the silicon carbide is of the alpha (non-cubic) phase, and preferably at least 99 percent by weight. Furthermore, the ceramic fiber has a predominately equiaxed microstructure. Preferably, the microstructure contains at least about 90 percent equiaxed grains, and more preferably consists essentially of equiaxed grains. The term "equiaxed grains" as used herein refers to a crystal microstructure in which the grains have an aspect ratio of less than 3:1, i.e., the ratio of the maximum dimension of the grains to the minimum dimension is less than 3:1.

The fibers of the present invention can be used for reinforcement in other structural materials, such as metals, ceramics, glass, glass ceramics, graphite, carbon and polymers. In addition, other structural materials utilizing or requiring internal structural support are foreseeable uses of the fibers of the current invention.

The fibers of the present invention are particularly desirable since a particular non-oxide ceramic can be selected to obtain a desirable coefficient of thermal expansion to match materials being reinforced. In addition, numerous non-oxide ceramics have good corrosion resistance chemical resistance, oxidation resistance and retain high strength in contact with molten metal which is not obtainable with oxide type ceramic materials.

The following examples serve to illustrate and not limit the present invention. Unless otherwise indicated, parts and percentages are by weight.

EXAMPLE 1

| Ingredients | |
|---|---|
| Submicron alpha silicon carbide (having a specific surface area of about 15–18 m²/g and an average particle size of less than 0.5 micron) | 1,500.0 grams |
| Corn Oil or similar mixture of fatty acids | 98.0 grams |
| B₄C (micronized to less than 1 micron) | 7.5 grams |
| Acetone | 1,800.0 grams |
| Filtered Novolac resin (MW ~ 800) | 57.0 grams |

Figure 2A:
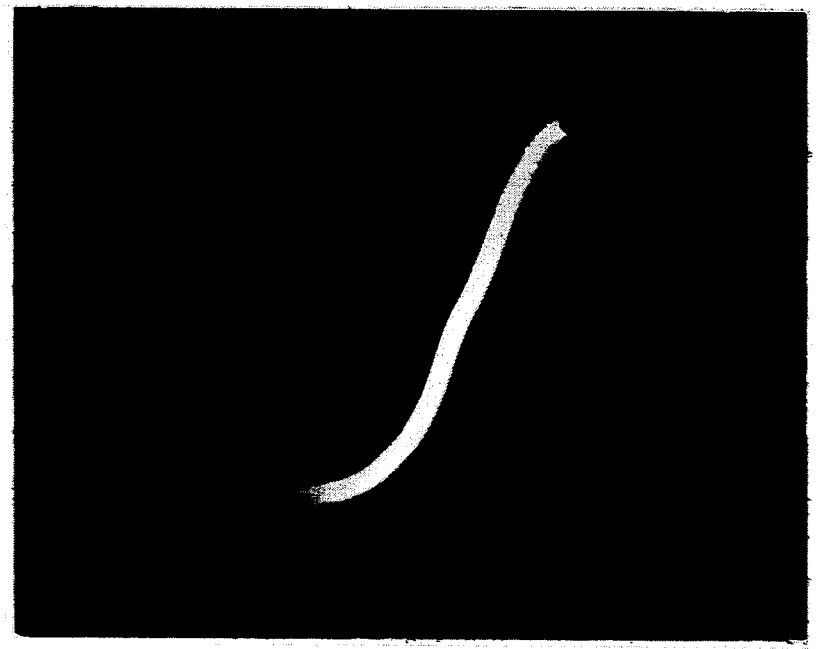
FIGS. 2–4 are photomicrographs of fibers prepared according to the present invention.
Figure 2B:
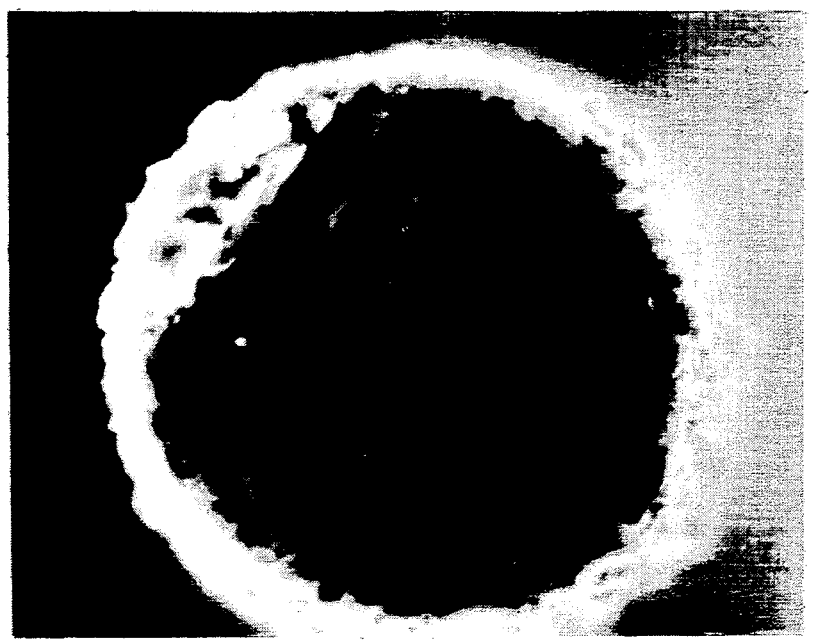

The ingredients were placed in jaw mill containing silicon carbide media. Milling was carried out for approximately 96 hours, thereafter the contents were discharged into an open container equipped with a stirrer. The materials were stirred allowing the acetone to evaporate. While the acetone was evaporating, paraffin oil (180.0 grams), polyethylene GUR 412 Hoechst (60.0 grams), and polyethylene FN 510 ICI (109.0 grams) were added. Once the acetone evaporated to the point the slurry had a mortar like consistency, it was compounded. The compounding consisted of placing the concentrated slurry in a Brabender type mixing bowl and heating it to 150° C. Thereafter it was mixed at about 40 rpm for at least 30 minutes. During the mixing the polyethylenes are dissolved in the oils and comingled with the dispersed powders. The compound mix was removed, cooled and chopped into random small sized pieces. The pieces of the mix were fed to an extruder and extruded using a ¾" screw extruder containing a series of 6 screens with successively smaller openings from 300μm to 5μm and equipped with a strand die. The extruded strand was cooled and cut in ⅛" lengths. The pellets produced were fiberized. The pellets were then melted in small extruder and delivered to a gear pump which metered the material to a spinnerette plate containing 20 holes having a diameter of 0.1 mm each. Godet rolls provided further attenuation to a 50 micron diameter fiber. The attenuated fibers were gathered into a bundle, collected and spooled using a traversing winder at about 150' per minute. The spool was removed from the winder and immersed in a container of heptane where the paraffin and corn oils were extracted. The fibers were dried and prepared for continuous sintering. The extracted green fiber tow was coated by passing it through a 0.75% solution of Q-PAC ™ (Air Products and Chemicals) and toluene at 15' per minute. The fibers were processed through the calcining and sintering furnaces at 15" per minute. The two-zone calcining furnace was kept at 250° C. and 375° C. respectively and the sintering furnace was kept at 2,225° C. The mean diameter of the fiber was 40 microns. The sintered fibers were evaluated for strength by a single fiber test using a 10" gage test. The 1" strength is obtained from the test data using Weibull statistics. The mean strength of the fiber obtained in the 10" sample is 51,000 psi with a Weibull modulus of 3.0. The extrapolated 1" strength is 110,000 psi. FIGS. 2A and 2B show respectively that the low strength is due to kinks and high porosity in the fiber.

EXAMPLE 2

Figure 3A:
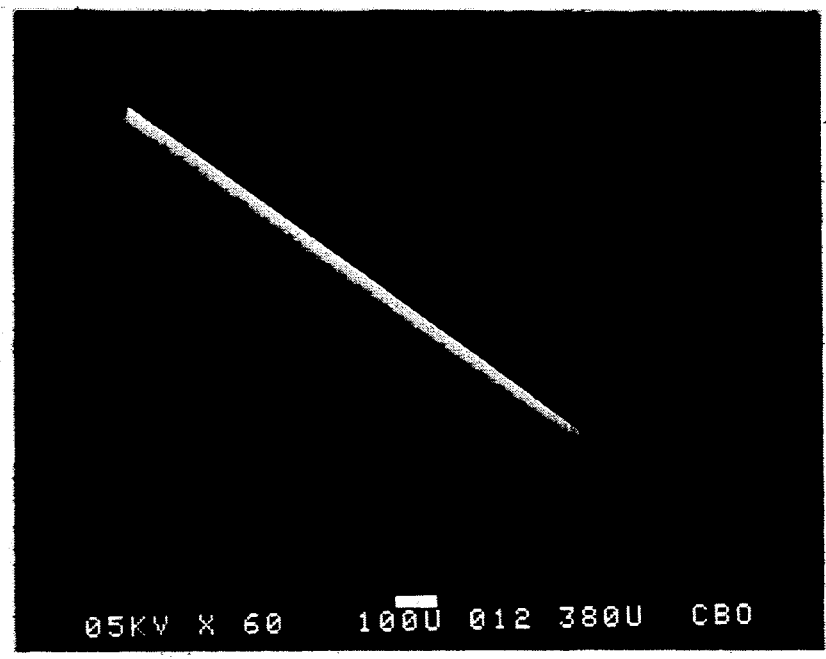
Figure 3B:

A green fiber is prepared as in example 1. The green sizing is identical to Example 1. In this example, however, sintering was carried out in a two pass operation. During the first pass, the fibers were passed through a calcining and sintering furnace to make a pre-sintered package at 15" per minute. Two-zoned calcining temperatures were 250° C. and 525° C. and the sintering temperature was 1,900° C. The pre-sintered package was subjected to a second pass through the sintering furnace. The sintering temperature was 2,200° C. and the speed was 15" per minute. During the second pass the fiber tow was subjected to a tension of 50–75 psi. The mean diameter of the fiber was 42 microns. The mean strength of the sintered fibers on the 10" gage test is 87,000 psi with a Weibull modulus of 5.7. The extrapolated 1" strength test was 130,000 psi. FIGS. 3A and 3B respectively show that the application of two-staged sintering under tension produced straight fibers without kinks. The only defect appears to be low porosity.

EXAMPLE 3

| Ingredients | |
| --- | --- |
| Submicron Alpha silicon carbide (as in example 1) | 930.0 grams |
| Corn Oil or similar mixtures of fatty acids | 60.8 grams |
| B₄C (micronized to less than 1 micron) | 37.2 grams |
| Acetone | 1,800.0 grams |
| Filtered Novolac resin (MW ~ 800) | 35.3 grams |
| Paraffin Oil | 111.6 grams |
| Polyethylene (GUR 412 Hoescht) | 37.2 grams |
| Polyethylene (FN 510 ICI) | 67.6 grams |

The green fiber was prepared using the above-identified ingredients according to the procedure outlined in example 1.

The extracted green fiber tow was given a coating by passing it through a 0.75% Q-PAC ™ (Air Products and Chemicals) solution in toluene at 15' per minute. The sized fibers were subjected to two pass sintering. During the first pass the fibers were calcined and pre-sintered at 15" per minute. The two stage calcining temperatures were 250° C. and 525° C. respectively and the sintering temperature was 1,900° C. During a second pass the fibers were sintered at 2,175° C. at 29" per minute under a tension of 50–75 psi. The mean diameter of the sintered fiber was 33 microns. The mean strength of the fiber on a 10" gage was 129,000 psi with a Weibull modulus of 5.0. The 1" extrapolated strength was 204,000 psi. The creep resistance of the fiber was evaluated at 1,400° C. for 1 hour according to the procedure by DeCarlo and gave a 0.79 creep parameter.

The thermal stability of the fiber was evaluated by aging the fiber in air in 1,370° C. for 12 hours. The fiber showed no degradation in tensile strength. Particularly, a 1" mean strength extrapolation from a 5" gage test showed 205,000 psi before and 201,000 psi after thermal aging.

Figure 4:

The microstructure of the fiber shown in FIG. 4 shows that the current process obtains low porosity and no kinking in a continuously sintered fiber.

EXAMPLE 4

A green fiber was prepared according to the description of example 1. Sintering was carried out by a two pass operation wherein the the fibers were first passed through the calcining and sintering furnaces to make the pre-sintering package at 15" per minute. The two-zone calcining furnace was kept at 250° C. and 525° C. respectively and the sintering furnace was kept at 1,900° C. During the second pass the fibers were sintered at 2,175° C. at 28" per minute with a tension of 50–75 psi. The average diameter of the sintered fiber was 28 microns. The average strength of the fiber from a 10" gage test was 109,000 psi with a Weibull modulus of 4.12. The 1" mean strength is calculated to be 191,000 psi. In this example, the sintering furnace was essentially closed to prevent the escape of sintering aid from the sintering atmosphere. Particularly, the openings at each end where the fiber enters and exits were significantly narrowed. Thus, boron loss was minimized and the strength of the fiber was increased. The openings in examples 1, 2, and 3 were ⅜" while the opening in example 4 was 3/16".

EXAMPLE 5

The green fiber was prepared according to the description of Example 3. The extracted green fiber tow was coated bypassing it through a 0.75% Q-PAC ™ (Air Products and Chemicals) solution in toluene at 15" per minute. The sized fibers were subjected to two pass sintering. During the first pass the fibers were calcined and pre-sintered at 15" per minute. The two stage calcining temperatures were 250° C. and 525° C. respectively and the sintering temperature was 1900° C. During a second pass the fibers were sintered at 2175° C. at 28.5" per minute. The sintering was performed in a furnace an essentially closed furnace as described in Example 4, i.e. 1/16" diameter openings. The mean diameter of the fiber was 32 microns. The mean tensile strength of the fiber on a 10" gage was 164,000 psi with a Weibull modulus of 5.8. The extrapolated 1" tensile strength was 245,000 psi.

EXAMPLE 6

Approximately 60.0 grams of green SiC fiber are prepared per Example 3. The fiber is cut into 6 mm lengths and the pieces are randomly loaded into a 75×150 mm compression mold. The loaded fiber pieces are compacted with sufficient pressure to produce a block about 6 mm thick. The block is sintered in Argon at 2150° C. for 60 minutes. The sintered fiber compact is pressure infiltrated with molten aluminum to produce an aluminum block reinforced with SiC fibers.

EXAMPLE 7

Alpha SiC powder having a specific surface area of about 10 m$^2$/g, an average particle size of less than 1.0 micron and containing 0.5% B$_4$C (56.0 g)
Resole phenolic resin (MW 300)(1.3 g)
Oleic acid (1.3 g)
Polyethylene glycol (MW 300)(1.3 g)

The above chemicals are placed in a 500 ml ball mill jar and mixed with alcohols (ethanol with 5% methanol) and milled for 2 hours.

12.0 g of SiC fibers prepared per Example 3 are placed in a mortar and pestal and lightly chopped to achieve lengths of between 1.5 and 3.0 mm.

The milled mix is poured into a glass dish and allowed to settle. The clear alcohol is decanted and the remaining slurry placed on a hot plate to evaporate solvent and thicken. The 12.0 g of crushed SiC fibers are slowly added to the slurry while stirring. The blend is then dried.

The dry powder is placed in a 63.5 mm square steel mold and cold pressed. The cold pressed plate is then isopressed to 17,000 psi and sintered to 2150° C. in argon, to form a SiC carbide composite reinforced with SiC fiber.

The fibers of the current invention once incorporated into composites are envisioned as meeting a significant hurdle in the development of high temperature engines for high speed air transport and for space travel.

Thus it is apparent that there has been provided in accordance with the invention a sintered non-oxide ceramic fiber, its process of manufacture, and a composite reinforced with the fiber that fully satisfy the objects, aims and advantages set forth above. While the invention has been described in conjunction with specific embodiments thereof, it is evident that many alterations, modifications, and variations will be apparent to those skilled in the art in light of the foregoing description. Accordingly, it is intended to embrace all such alternatives and modifications, and variations as fall within the spirit and broad scope of the appended claims.

What is claimed:

1. A process for producing a sintered polycrystalline silicon carbide fiber which comprises blending about 5 to about 25 weight percent polymer, and about 70 to about 95 weight percent silicon carbide, thereby producing a blend, and then forming a fiber from said blend, pre-sintering said fiber at a first temperature of about 1700° C. to about 2300° C., and then sintering said pre-sintered fiber at a second temperature greater than said first temperature.

2. The process of claim 1 wherein said polymer is selected from the group consisting of phenolics, polyolefins, polyhalogenated olefins, and mixtures thereof.

3. The process of claim 1 wherein said sintering is carried out continuously.

4. The process of claim 1 wherein tension is applied to said fiber during said sintering.

5. The process of claim 1 wherein said blend comprises at least about 0.2 weight percent boron carbide.

6. The process of claim 1 wherein said second temperature is between about 2100° C. and 2300° C.

7. The process of claim 5 wherein said mix comprises at least 3.8 weight percent boron carbide.

8. The process of claim 1 wherein an effective amount of sintering aid is maintained in a sintering atmosphere during said pre-sintering and said sintering.

9. The process of claim 1 wherein said pre-sintering and sintering are performed in a nitrogen atmosphere.

10. The process of claim 1 wherein said pre-sintering and sintering are performed in an argon atmosphere.

11. The process of claim 7 wherein said mix comprises at least 4 weight percent boron carbide.

* * * * *